(12) United States Patent
Shin et al.

(10) Patent No.: US 11,672,342 B2
(45) Date of Patent: Jun. 13, 2023

(54) FOLDING SEAT

(71) Applicant: DAECHANG SEAT CO., LTD-DONGTAN, Gyeonggi-do (KR)

(72) Inventors: Jae Kwang Shin, Gyeonggi-do (KR); Myung Soo Lee, Gyeonggi-do (KR); Chan Ki Cho, Gangwon-do (KR)

(73) Assignee: DAECHANG SEAT CO., LTD-DONGTAN, Gyeonggi-Do (KR)

( * ) Notice: Subject to any disclaimer, the term of this patent is extended or adjusted under 35 U.S.C. 154(b) by 0 days.

(21) Appl. No.: 17/470,494

(22) Filed: Sep. 9, 2021

(65) Prior Publication Data

US 2022/0079344 A1 Mar. 17, 2022

(30) Foreign Application Priority Data

Sep. 14, 2020 (KR) .................. 10-2020-0117373

(51) Int. Cl.
*A47C 4/04* (2006.01)
*B60N 2/30* (2006.01)

(52) U.S. Cl.
CPC .............. *A47C 4/04* (2013.01); *B60N 2/3011* (2013.01)

(58) Field of Classification Search
CPC ...... A47C 4/04; B60N 2/3011; B60N 2/3047; B60N 2/3013; B60N 2/2218; B60N 2002/952; B60N 2/10; B60N 2/20; B60N 2/22
USPC .......................................................... 297/4
See application file for complete search history.

(56) References Cited

U.S. PATENT DOCUMENTS

| 2006/0152055 A1* | 7/2006 | Yudovich ............. | B60N 2/3047 |
| | | | 297/331 |
| 2011/0049958 A1* | 3/2011 | Ma ........................ | B60N 2/309 |
| | | | 297/378.12 |

FOREIGN PATENT DOCUMENTS

| DE | 10318718 | * | 11/2004 |
| DE | 10318718 A1 | | 11/2004 |
| EP | 1462301 | * | 9/2004 |
| EP | 1462301 A2 | | 9/2004 |
| JP | H05-007863 Y | | 2/1993 |
| JP | 2004528227 A | | 2/2004 |
| JP | 2009-067309 A | | 4/2009 |

(Continued)

OTHER PUBLICATIONS

European Search Report for EP Patent Application No. 21194546.4 dated Jan. 31, 2022.

(Continued)

*Primary Examiner* — Mark R Wendell
(74) *Attorney, Agent, or Firm* — The Dobrusin Law Firm, P.C.

(57) ABSTRACT

Proposed is a folding seat that is capable of being folding to various positions by controlling a lever and the folding seat is capable of improving utilization of space around the folding seat. According to an embodiment of the present disclosure, the folding seat includes: a seat frame; a seat back frame cross-arranged in back of the seat frame, the seat back frame having a first side rotatably coupled to the seat frame; and a locking portion coupled at a first side thereof to the seat back frame and rotatably coupled at a second side thereof to the seat frame at a position between the seat frame and the seat back frame, wherein the locking portion is configured to be inserted into a rear portion of the seat frame or to be separated from the seat frame according to an operation thereof.

4 Claims, 5 Drawing Sheets

(56) References Cited

FOREIGN PATENT DOCUMENTS

| | | | |
|---|---|---|---|
| JP | 2019077223 | A | 5/2019 |
| KR | 1020020032238 | A | 5/2002 |
| KR | 10-0794038 | B1 | 1/2008 |
| KR | 2020090011474 | U | 11/2009 |
| KR | 10-1643888 | B1 | 8/2016 |
| WO | 2004/028302 | A1 | 4/2004 |

OTHER PUBLICATIONS

Japanese Office Action for JP Patent Application No. 2021-147227 dated Oct. 4, 2022.
Korean Office Action for KR Patent Application No. 10-2020-0117373 dated Dec. 11, 2021.
Korean Decision for Grant for KR Patent Application No. 10-2020-0117373 dated May 21, 2022.

\* cited by examiner

FOLDING SEAT

CLAIM OF PRIORITY

The present application claims priority to Korean Patent Application No. 10-2020-0117373, filed Sep. 14, 2020, the entire contents of which is incorporated herein for all purposes by this reference.

FIELD OF THE INVENTION

The present disclosure relates to a seat. More particularly, the present disclosure relates to a folding seat that is capable of being folded.

BACKGROUND

Description of the Related Art

Unless otherwise indicated herein, the descriptions set forth in this identification are not the related art to the claims of this application and are not to be recognized as the related art as described herein.

Generally, a folding seat used in a vehicle may improve utilization of space inside the vehicle by the folding seat being folded or moved inside the vehicle. More particularly, by folding a rear seat or moving a position of the rear seat, utilization of a loading space inside the vehicle may be improved.

However, in existing folding seats, components used to fold a seat frame that supports a lower body of a passenger toward a seat back or to fix the seat frame are complicated and various, so that there is a disadvantage in that weight of a seat increases and a maintenance cost increases.

In addition, a folding direction of the seat frame or the seat back frame that configure the folding seat is limited, so that there is a disadvantage in that utilization of space around the folding seat by folding the folding seat is limited.

In this regard, Korean Patent No. 10-0794038 discloses a locking equipment for vehicle's folding seat and Korean Patent No. 10-1643888 discloses a leg rest for vehicle.

However, these techniques in the related art do not disclose a technique capable of providing various space by a seat back frame of a folding seat being folded together.

SUMMARY OF THE INVENTION

Accordingly, the present disclosure has been made keeping in mind the above problems occurring in the related art, and the present disclosure is intended to propose a folding seat in which the folding seat is capable of being folding to various positions by controlling a lever, and the folding seat being capable of improving utilization of space around the folding seat.

In addition, the present disclosure is not limited to the technical problems as described above, and it is obvious that any other technical problem could be derived from the description of the invention as described below.

According to an embodiment of the present disclosure, the folding seat includes: a seat frame; a seat back frame cross-arranged in back of the seat frame, the seat back frame having a first side rotatably coupled to the seat frame; and a locking portion coupled at a first side thereof to the seat back frame and rotatably coupled at a second side thereof to the seat frame at a position between the seat frame and the seat back frame, wherein the locking portion is configured to be inserted into a rear portion of the seat frame or to be separated from the seat frame according to an operation thereof.

In addition, the locking portion may include: a first bracket coupled to a side surface of the seat back frame; a stopper slidably coupled to the first bracket so that the first bracket is inserted into or separated from the seat frame; and a leg frame rotatably coupled to the seat frame and connected to the stopper by a cable.

In addition, the leg frame may be bent and extend from a lower portion of the seat frame toward the seat frame at a first side and a second side thereof and is rotatably coupled to the seat frame, and an end surface of the first side or the second side of the leg frame may be connected to the cable.

In addition, a wire inside the cable that is coupled to the leg frame may be fixed to the seat frame at a position below the leg frame when the leg frame is in a state in which the leg frame is folded so as to be positioned adjacent to the lower portion of the seat frame.

In addition, the folding seat may further include a latch portion, the latch portion being coupled to the seat back frame and being configured to adjust a folding angle of the seat back frame by an operation of a lever.

According to an embodiment disclosed in the present specification, when the folding seat is in a state in which the seat frame is folded to the seat back frame or the seat back frame is descended and folded to the seat frame, a structure of the locking portion that is configured to fix positions of the seat back frame and the seat frame is simplified, so that there is an advantage in that weight of the folding seat is reduced.

In addition, there are advantages in that the folding seat is capable of being folded by a rotation of the leg frame that is rotatably coupled to a lower portion of the seat frame, and the leg frame is capable of being operated by a switch that is for operating the locking portion while a portion of the seat frame is moved toward a frontward direction or a rearward direction.

In addition, since the leg frame of the folding seat positioned at the lower portion of the seat frame is automatically folded when the seat back frame is moved toward the frontward direction when after the lever of the latch portion formed at the upper portion is pulled, the seat back frame and the seat frame of the folding seat are converted to a foldable state, so that there is an advantage in that the seat back frame is capable of being conveniently folded toward the frontward direction and the downward direction from in back of the folding seat.

In addition, the locking portion of the folding seat is capable of being remodeled by performing a process in which brackets are additionally installed to a structure of an existing folding seat, so that there is an advantage in that the folding seat is capable of being utilized for various types of vehicles.

In addition, since the effects of the present disclosure described above are to be naturally exerted by the configuration of the content described irrespective of whether or not the inventor recognizes such effects, the above-described effects are only a few effects according to the content described, and it should not be recognized that all the effects which are understood by the inventor are actually described herein.

In addition, the effects of the present disclosure will be further understood by the entire description of the specification, and if those having ordinary knowledge in the technical field to which the description belongs recognize such effects in the present specification even if the effects are not described in explicit sentences, the effects will be recognized as being described in the present specification.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
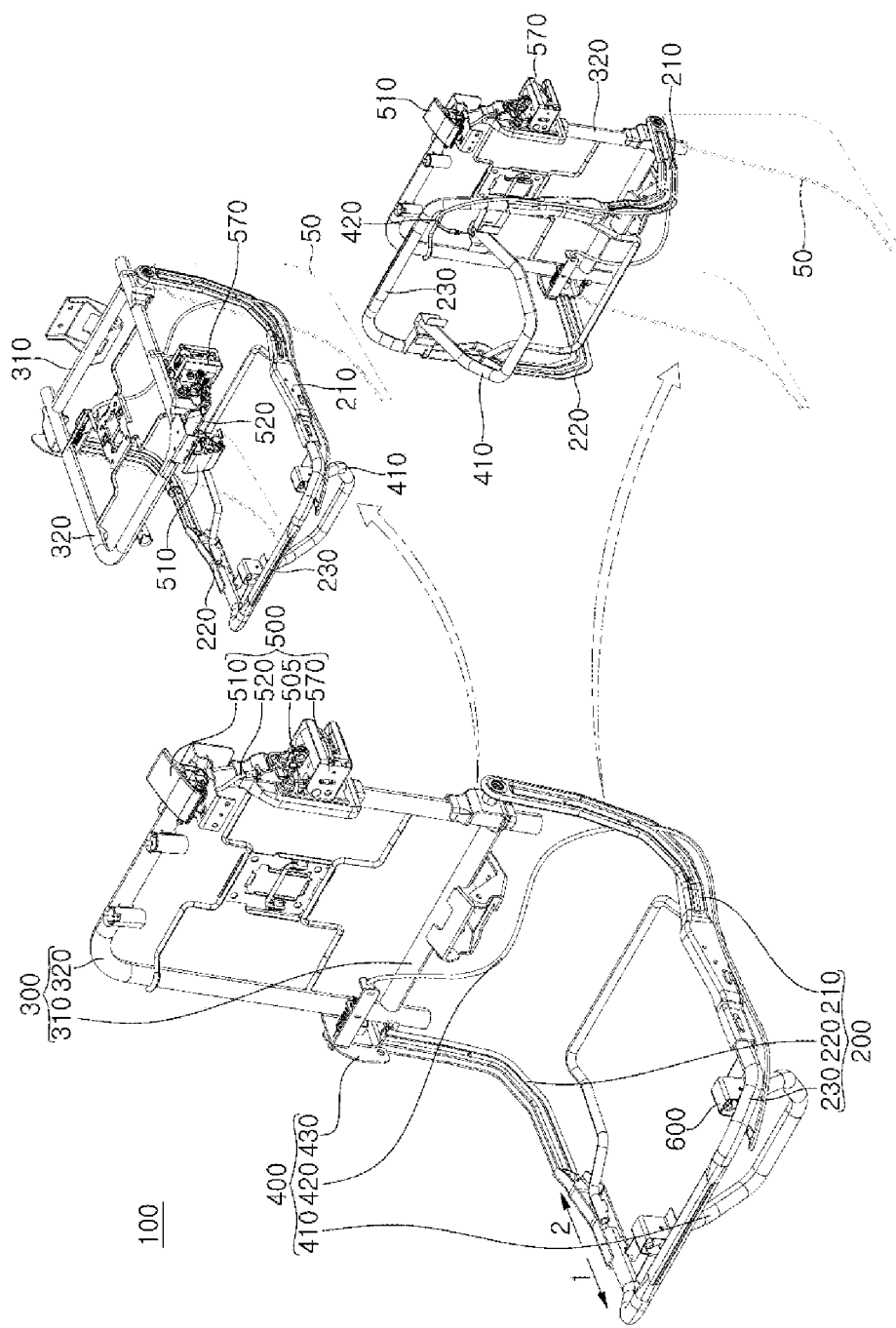
FIG. 1 is a view illustrating usage states of a folding seat according to an embodiment of the present disclosure.

Hereinafter, the configuration, operation, and effect of a folding seat according to exemplary embodiments will be described with reference to the accompanying drawings. For reference, in the drawings, each component is omitted or schematically illustrated for convenience and clarity of illustration, and the size of each component does not completely reflect a real size. Further, the same reference numerals are used throughout the different drawings to designate the same or similar components. In the individual drawings, reference numerals for the same components will be omitted.

Generally, a folding seat used in a vehicle may improve utilization of space inside the vehicle by the folding seat being folded or moved inside the vehicle. More particularly, by folding a rear seat or moving a position of the rear seat, utilization of a loading space inside the vehicle may be improved.

However, in existing folding seats, components used to fold a seat frame that supports a lower body of a passenger toward a seat back or to fix the seat frame are complicated and various, so that there is a disadvantage in that weight of a seat increases and a maintenance cost increases.

When the folding seat 100 is in a state in which a seat frame is folded to a seat back frame or the seat back frame is descended and folded to the seat frame, a structure of a locking portion that is configured to fix positions of the seat back frame and the seat frame is simplified, so that there is an advantage in that weight of the folding seat 100 is reduced.

In addition, there are advantages in that the folding seat 100 is capable of being folded by a rotation of a leg frame that is rotatably coupled to a lower portion of the seat frame, and the leg frame is capable of being operated by a switch that is for operating the locking portion while a portion of the seat frame is moved toward a frontward direction or a rearward direction.

In addition, since the leg frame of the folding seat 100 positioned at the lower portion of the seat frame is automatically folded when the seat back frame is moved toward the frontward direction when after the lever of the latch portion formed at the upper portion is pulled, the seat back frame and the seat frame of the folding seat 100 are converted to a foldable state, so that there is an advantage in that the seat back frame is capable of being conveniently folded toward the frontward direction and the downward direction from in back of the folding seat 100.

The folding seat 100 includes a fixing frame 50, a seat frame 200, a seat back frame 300, a locking portion 400, a latch portion 500, and a bracket portion 600.

A first end portion of each of the fixing frames 50 spaced apart from each other and positioned at a first side and a second side of an inside of a vehicle is coupled to the vehicle, and a second end portion of each of the fixing frames 50 that extends toward an upward direction allows the seat frame 200 and the seat back frame 300 to be rotatable by being cross-coupled between the seat frame 200 and the seat back frame 300.

The seat frame 200 includes a first frame 210, a second frame 220, and an extending frame 230.

A first end portion of the seat frame 200 has a bar shape, and both a portion of the bar shape at the first side and a portion of the bar shape at the second side extend toward the first side and the second side from a first direction 1 side and are bent toward a second direction 2. Therefore, the first end portion of the seat frame 200 is formed in a rectangular frame shape in which a frame corresponding to a line at the second direction 2 side does not exist.

A second end portion of the seat frame 200 extends toward the second direction 2 from the first end portion of the seat frame 200 by a predetermined distance. Portions of respective end portions of the second end portion of the seat frame 200 are bent and extend toward the upward direction, and are rotatably coupled to both the fixing frames 50 and the seat back frame 300 with respect to shafts that extend toward the first side or the second side from respective outer sides of the fixing frames 50.

A first end of the first frame 210 is formed in a hexahedral shape having a space inside thereof formed in a cylindrical shape open toward the second side, and extends toward the second direction 2 by a predetermined distance. Further, the first end of the first frame 210 is slidably coupled to a first side portion of the extending frame 230 so as to be slidably movable toward the first direction 1 or the second direction 2.

A second end of the first frame 210 is formed in a plate shape having wide surfaces respectively facing the first side and the second side, and is bent and extends in a parabolic shape toward the upward direction from the first end of the first frame 210 and is rotatably coupled to both the fixing frame 50 at the first side and the seat back frame 300.

A first end of the second frame 220 is formed in a hexahedral shape having a space inside thereof formed in a cylindrical shape open toward the first side so that the same structure of which the first end of the first frame 210 has is formed, and is arranged at a position spaced apart from the first end of the first frame 210 toward the second side by a predetermined distance.

A second end of the second frame 220 is formed in a plate shape having wide surfaces respectively facing the first side and the second side, and is bent and extends in a parabolic shape toward the upward direction from the first end of the second frame 220 and is rotatably coupled to both the fixing frame 50 at the second side and the seat back frame 300.

At an end portion of the second end of the second frame 220, a portion at the first direction 1 side expands and extends in a plate shape that surrounds the end portion of the second end of the second frame 220 at the first direction 1 side, so that a first rotation member 221 is formed. Further, insertion holes 222 and 223 that penetrate opposite side surfaces of the first rotation member 221 are formed at an upper portion and a lower portion toward the first direction 1 of the first rotation member 221, respectively.

A portion of the locking portion 400 that will be described later is configured to be inserted into one of the insertion hole 222 and the insertion hole 223. By a folding operation of the seat frame 200 or the seat back frame 300, the portion of the locking portion 400 is inserted into any one of the insertion holes 222 and 223.

A center portion of the extending frame 230 extends in a cylindrical stick shape toward the first side or the second side, and a first side portion of the extending frame 230 and a second side portion of the extending frame 230 that are respectively formed at the first side and the second side of the center portion of the extending frame 230 are bent and extend toward a downward direction and the second direction 2. Therefore, the first side portion of the extending frame 230 and the second side portion of the extending frame 230 are slidably coupled to the first end portion of the first frame 210 and the first end portion of the second frame 220, respectively, so as to be slidably movable toward the first direction 1 or the second direction 2.

The first side portion and the second side portion of the extending frame 230 are inserted inside the first end of the first frame 210 and the first end of the second frame 220, respectively, and are coupled to be slidable toward the first direction 1 or the second direction 2.

The seat back frame 300 includes a connecting frame 310 and an upper frame 320.

A first end portion of the seat back frame 300 is formed in a rectangular frame shape in which a portion of a frame corresponding to a line at the upward direction does not exist. Further, at a lower portion of the first end portion of the seat back frame 300, the first end portion of the seat back frame 300 at the first side and the first end portion of the seat back frame 300 at the second side are rotatably coupled to the second end portion of the seat frame 200 at the first side and the second end portion of the seat frame 200 at the second side, respectively, with respect to shafts that extend toward the first side and the second side.

Second end portions of the seat back frame 300 extend toward the upward direction from the first end portions of the seat back frame 300 by a predetermined distance, and extend toward each other and are coupled therewith. Further, the second end portions of the seat back frame 300 are configured to be separated from or to be mounted to the vehicle by the latch portion 500 that is mounted to the first side or the second side of the second end portions of the seat back frame 300.

The connecting frame 310 is formed in a cylindrical shape that extends lengthwise toward the first side or the second side, and an end portion of the first side of the connecting frame 310 and an end portion of the second side of the connecting frame 310 may be respectively coupled to the lower portions of the upper frame 320 or may be manufactured to be an integral shape that the connecting frame 310 is coupled to the upper frame 320.

A center portion of the upper frame 320 extends toward the first side and the second side, and a first side portion of the upper frame 320 and a second side portion of the upper frame 320 that are respectively positioned at the first side and the second side are bent and extend toward the downward direction so that a rectangular frame shape is formed. Further, inner side surfaces that correspond to a lower portion of the first side portion of the upper frame 320 toward inside and a lower portion of the second side portion of the upper frame 320 toward inside are coupled to the end portion of the first side of the connecting frame 310 and the end portion of the second side of the connecting frame 310, respectively.

At the lower portions of the first side portion and the second side portion of the upper frame 320, respective outer surfaces of the upper frame 320 are rotatably coupled to each second ends of the fixing frame 50, the first frame 210, and the second frame 220 with respect to the shafts that extend toward the first side or the second side.

The locking portion 400 includes a leg frame 410, a cable 420, a first bracket 430, a second bracket 440, a spring 450, a stopper 460, and a fixing member 470.

The locking portion 400 is coupled at a first side thereof to the seat back frame 300 and is rotatably coupled at a second side thereof to the seat frame 200 at a position between the seat frame 200 and the seat back frame 300. Moreover, the locking portion 400 is connected to a switch having a frame shape, the switch being configured to operate the locking portion 400 by the cable 420.

By the locking portion 400 being operated and the portion of the locking portion 400 being inserted into any one of the insertion holes 222 and 223 that are formed at the seat frame 200, rotations of the seat frame 200 and the seat back frame 300 are limited.

Figure 2:
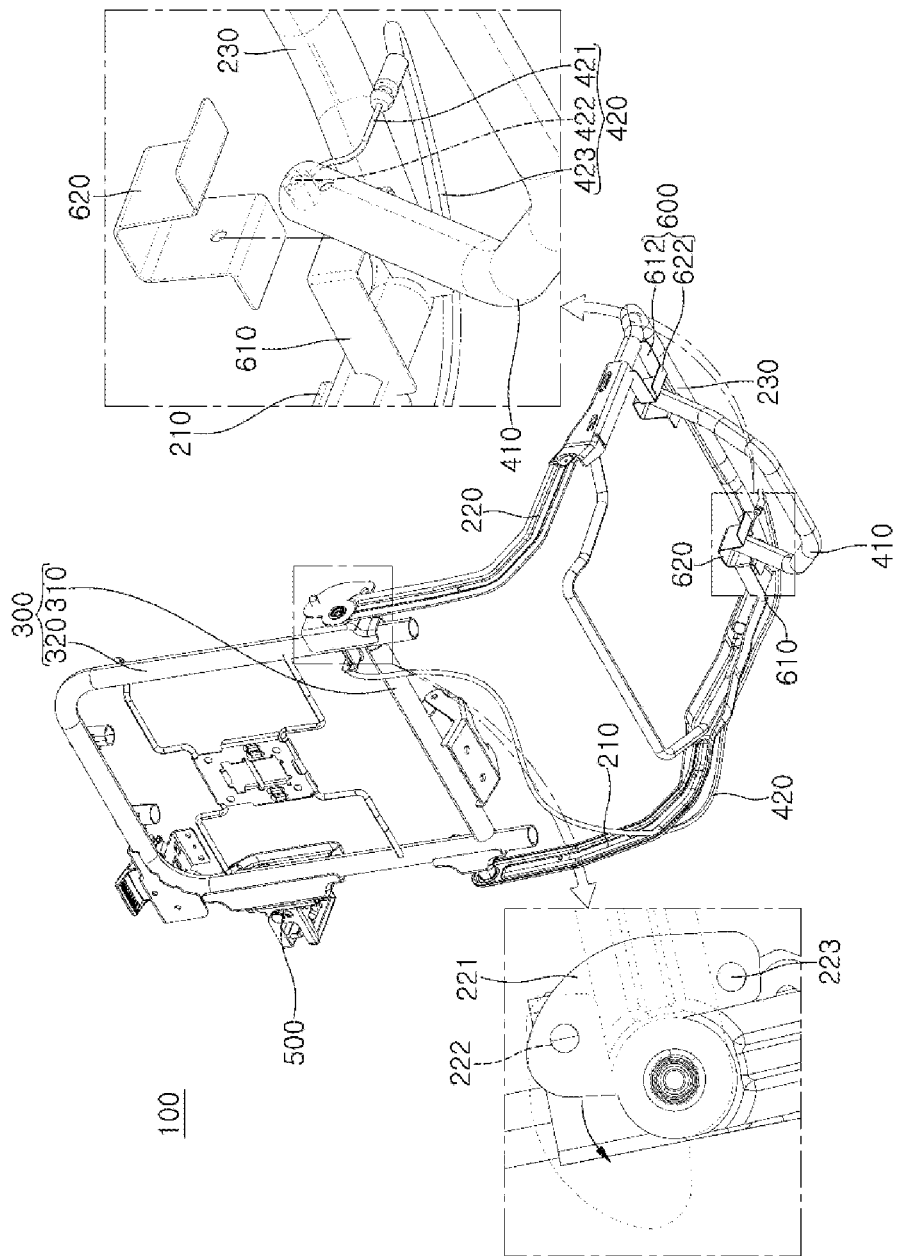
FIGS. 2 and 3 are perspective views illustrating the folding seat in FIG. 1.
Figure 3:
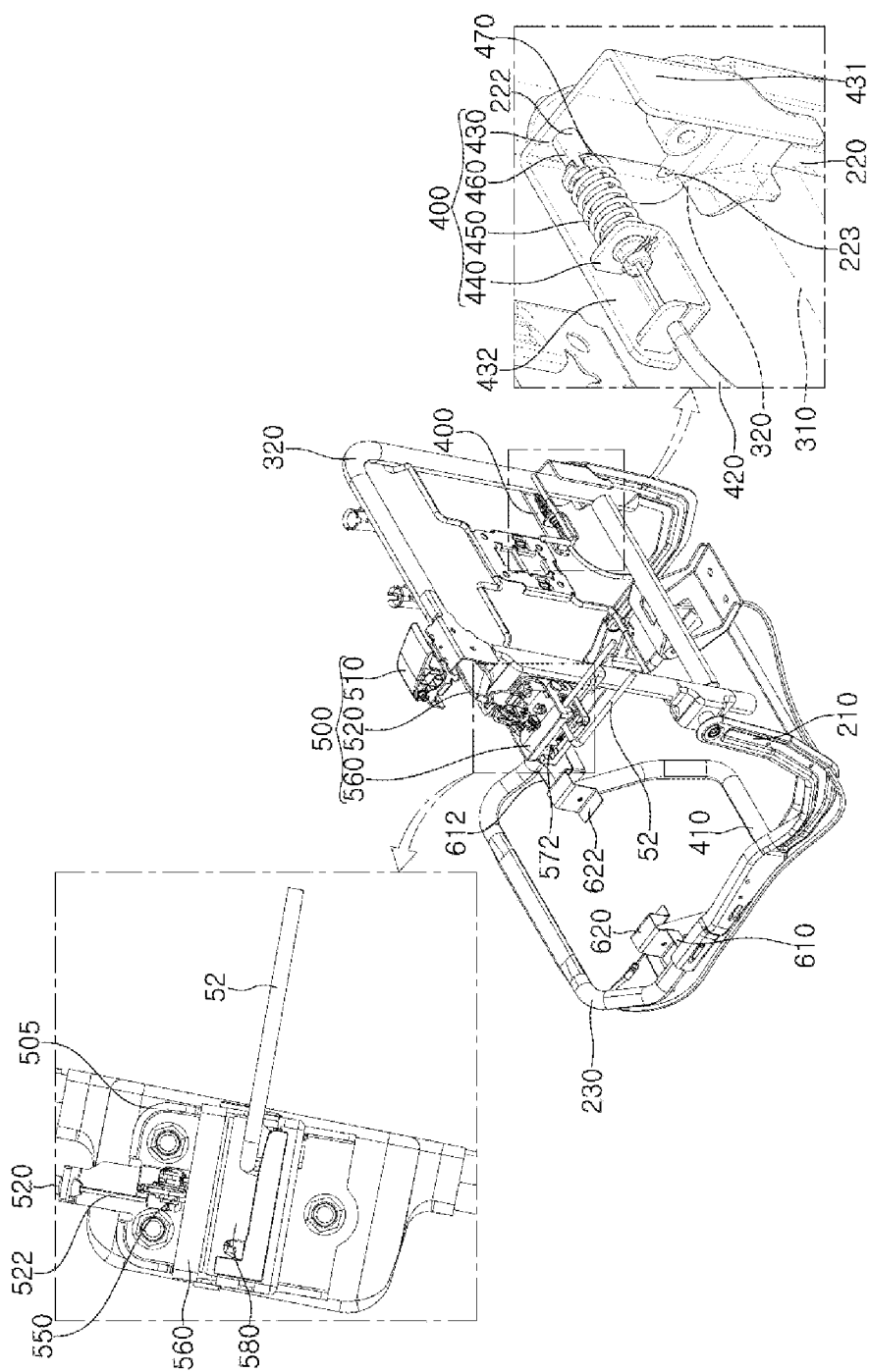
Figure 4:
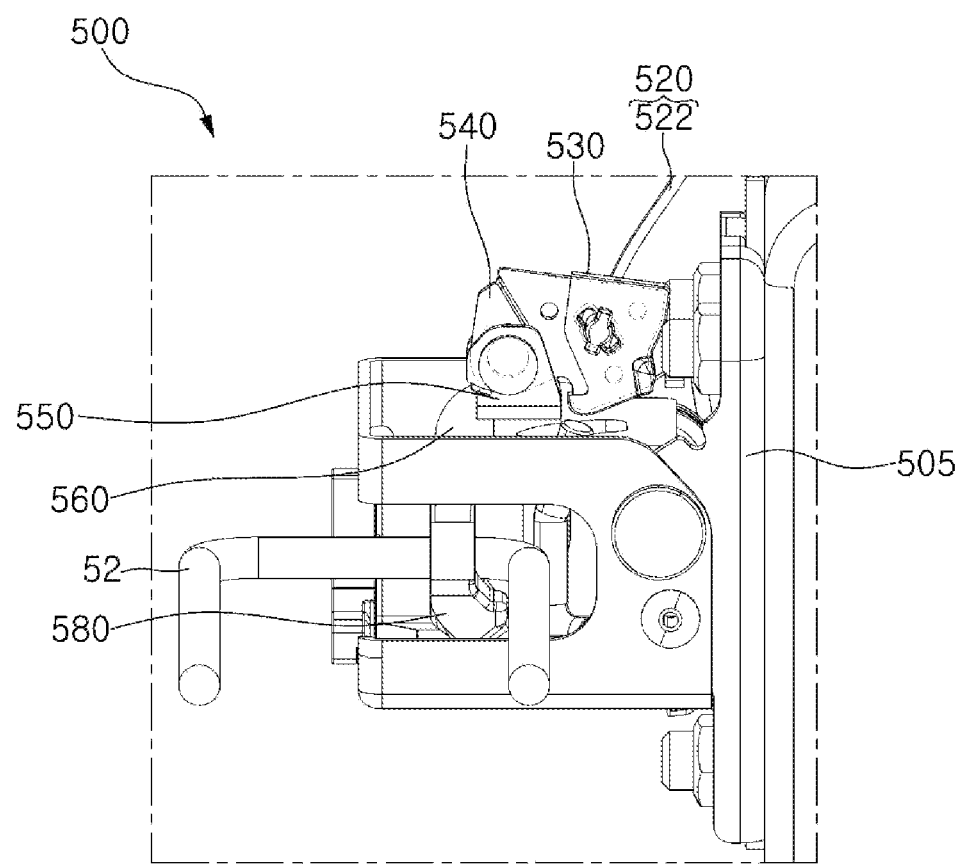
FIG. 4 is an enlarged view in which a latch portion of the folding seat in FIG. 1 is enlarged.

Referring to FIGS. 1 to 3, a center portion of the leg frame 410 is formed in a cylindrical shape that extends toward the first side or the second side, and a portion of the first side of the leg frame 410 and a portion of the second side of the leg frame 410 are bent and extend toward the first direction 1 so that a first side portion of the leg frame 410 and a second side portion of the leg frame 410 are formed.

By using the bracket portion 600, an outer side surface of the first side portion of the leg frame 410 and an outer side surface of the second side portion of the leg frame 410 are rotatably coupled to the seat frame 200 with respect to a shaft that extends toward the first side or the second side from inside of the first end portion of the seat frame 200.

The cable 420 includes a wire 421, a coupling member 422, and a sheath 423.

At an end of the first direction 1 side, a first end of the cable 420 is in a state in which the first end of the cable 420 is arranged to be spaced apart toward the first direction 1 from the first side portion of the leg frame 410 or the second side portion of the leg frame 410, and the first end of the cable 420 is coupled to the end of the first side portion of the leg frame 410 or the end of the second side portion of the leg frame 410.

A second end of the cable 420 extends along any one of the first frame 210 or the second frame 220, and is coupled to the stopper 460, the second end of the cable 420 being at a position adjacent to the second end of the second frame 220.

A first end of the wire 421 is connected to the coupling member 422 that extends in a cylindrical shape toward the first side or the second side. By the coupling member 422, the first end of the wire 421 is coupled to the portion of the first side portion of the leg frame 410 or the portion of the second side portion of the leg frame 410.

From the first end of the wire 421, a second end of the wire 421 extends in a wire shape along the first frame 210 or the second frame 220, and is coupled to an end of the stopper 460. Further, when the first end of the wire 421 is moved to the second direction 2 and the upward direction by an operation that the center portion of the leg frame 410 is moved toward the downward direction so that the center portion of the leg frame 410 is spaced apart from the lower portion of the seat frame 200, the second end of the wire 421 pulls the stopper 460.

On the contrary, when the first end of the wire 421 is moved to the first direction 1 and the downward direction by a folding operation that the center portion of the leg frame 410 is ascended so that the center portion of the leg frame 410 is folded toward the lower portion of the seat frame 200, the stopper 460 is moved to an original position thereof since the second end of the wire 421 moves toward the stopper 460.

The sheath 423 formed in a cylindrical shape surrounds the wire 421 and covers an outer surface of the wire 421 except the coupling member 422, and a movement of the wire 421 by the operation of the leg frame 410 is safely performed inside the sheath 423.

The first bracket 430 includes a second rotation member 431 and a stand member 432.

A first end portion of the first bracket 430 is formed in a bracket shape that surrounds outer side of the second side portion of the upper frame 320, and extends toward the upward direction or the downward direction and is coupled to the upper frame 320.

A portion at an upper portion of the first end portion of the first bracket 430 extends toward the upward direction, so that a second end portion of the first bracket 430 is coupled to the second side portion of the upper frame 320. Further, at the second end portion of the first bracket 430, an edge portion thereof at the first direction 1 side is formed in a plate shape that is bent and extends toward the first side with passing the first direction 1 side of the second side portion of the upper frame 320, and is coupled to the second bracket 440.

Specifically, a first end of the second rotation member 431 is formed in a bracket shape that surrounds both portions and outside toward the first direction 1 and the second direction 2 of the lower portion of the second side portion of the upper frame 320. A second end of the second rotation member 431 extends toward the upward direction from the first end of the second rotation member 431 and surrounds both outside and the second direction 2 side of the upper frame 320, and is formed in a bracket shape that is vertically bent.

At a first end of the stand member 432, an edge portion at the first direction 1 side of the second rotation member 431 extends in a vertical plate shape toward the first side by a predetermined distance, and covers at the first direction 1 side of the second side portion of the upper frame 320 and extends toward an inside of the upper frame 320.

A center portion of the second bracket 440 is formed in a plate shape in which a wide surface faces the upward direction and the downward direction. Further, at the first side and the second side from the center portion of the second bracket 440, a portion at the first side and a portion at the second side are bent and extend toward the upward direction so that a bracket shape is formed.

A front surface at the first direction 1 side of the second bracket 440 is coupled to a rear surface at the second side of the stand member 432, and at the second side of the second bracket 440 is provided with a through-hole so that the stopper 460 is movable in the first side or the second side.

At the second side of the second bracket 440, a first end of the spring 450 is coupled to the second bracket 440. A second end of the spring 450 extends in a cylindrical spiral shape toward the second side while the spring 450 surrounds the stopper 460, and is coupled to the stopper 460.

A first end of the stopper 460 is formed in a cylindrical shape that extends toward the first side or the second side, and is coupled to the second end of the wire 421 of the cable 420. Further, the first end of the stopper 460 is positioned to an upper portion of the center portion of the second bracket 440 by penetrating through the second side of the second bracket 440.

From the first end of the stopper 460, a second end of the stopper 460 extends by a predetermined distance toward the second side with passing a space inside the spring 450, and penetrates through the second rotation member 431 and the insertion hole 223, so that the second end of the stopper 460 protrudes toward outside of the second frame 220, The fixing member 470 is formed in a cylindrical flange shape. At the second side of the spring 450, the fixing member 470 is coupled to the stopper 460 by surrounding outside the stopper 460, and is configured to contract or expand the spring 450 when in a situation in which the stopper 460 is moved to the first side or the second side.

Therefore, when the latch portion 500 is separated from the vehicle and the center portion of the leg frame 410 is moved toward the downward direction so that the center portion of the leg frame 410 is folded to be spaced apart from the lower portion of the seat frame 200, the second end of the wire 421 pulls the stopper 460 toward the first side so that the seat back frame 300 and the seat frame 200 are converted to a state in which the folding operation is capable.

On the contrary, when the center portion of the leg frame 410 is ascended so that the leg frame 410 moves toward the lower portion of the seat back frame 300, the wire 421 pulling the stopper 460 becomes loose so that the second end of the spring 450 is elastically moved toward the second side, and the stopper 460 and the fixing member 470 are moved toward the second side, so that the second end of the stopper 460 is inserted into the insertion hole 222.

In a state in which the center portion of the upper frame 320 is moved to the first direction 1 and the downward direction so that the center portion of the upper frame 320 is folded to the upper portion of the seat frame 200, the insertion hole 223 is arranged at the second side of the stopper 460. Further, when the center portion of the leg frame 410 is ascended, the second end of the stopper 460 is inserted into the insertion hole 223 so that a position of the upper frame 320 that is folded is fixed.

Figure 5:
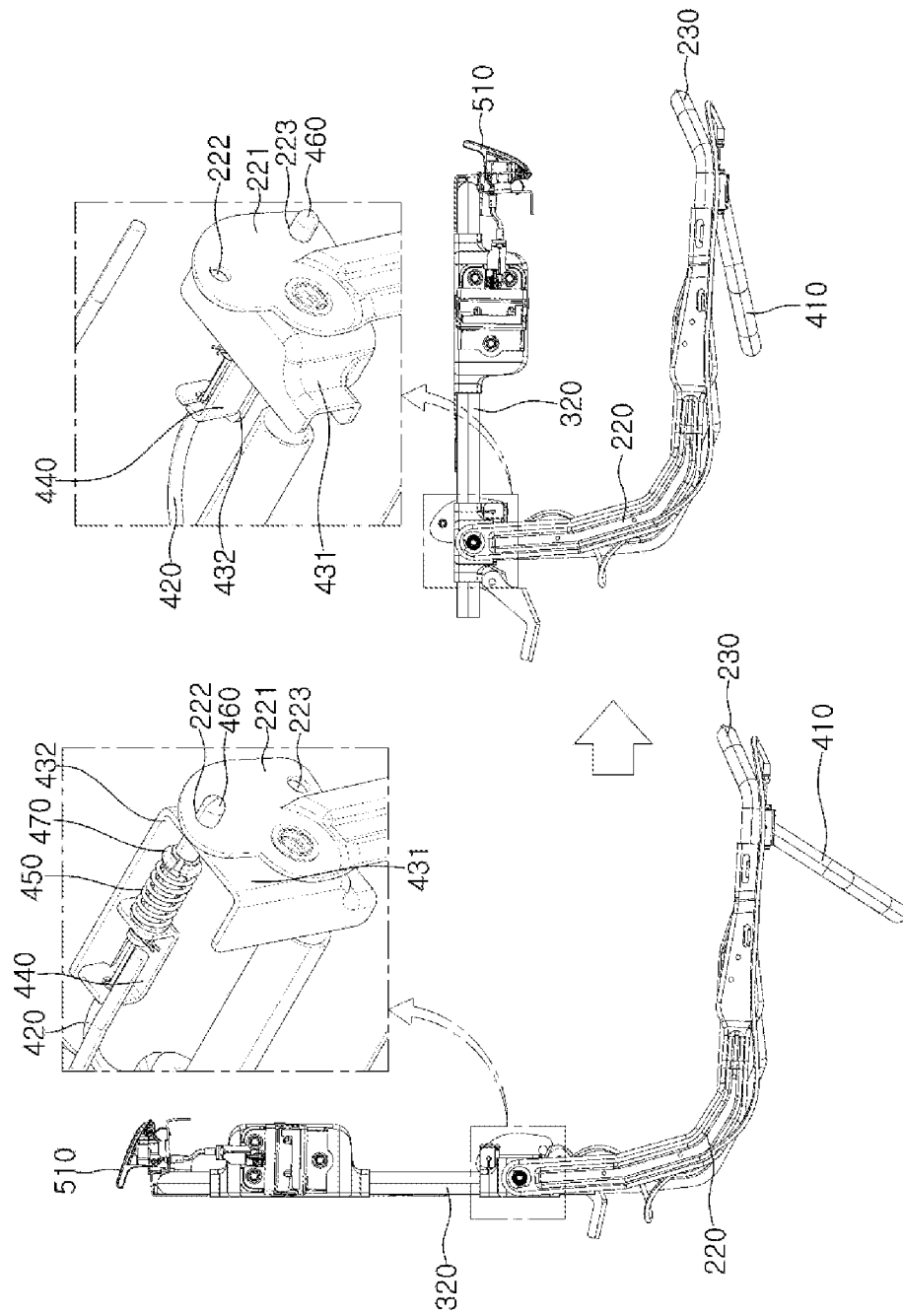
FIG. 5 is a perspective view illustrating an operation of the folding seat in FIG. 1.

Referring to FIG. 5, when a passenger in front of the seat back frame 300 or another passenger operating the latch portion 500 in back of the seat back frame 300 pushes the seat back frame 300 toward the first direction 1 in a state in which the seat back frame 300 is separated from the vehicle by the operation of the latch portion 500, the leg frame 410 is folded toward the lower portion of the seat frame 200 and the stopper 460 is separated from the insertion hole 222, and the seat back frame 300 is automatically folded to the upper portion of the seat frame 200.

Therefore, a passenger positioned at the second direction 2 side of the seat back frame 300 is capable of folding the seat back frame 300 toward the upper portion of the seat frame 200 by only performing a control that is controlling the latch portion 500 and moving the seat back frame 300 toward the first direction 1, there is an advantage in that a convenience of control of the folding seat 100 is improved.

In addition, in a state in which the seat back frame 300 is folded toward the upper portion of the seat frame 200 and the stopper 460 is inserted into the insertion hole 223, when the seat back frame 300 is moved to the second direction 2 and the upward direction, the seat frame 200 is moved to the upward direction and the center portion of the leg frame 410 is automatically descended by gravity so that the stopper 460 is separated from the insertion hole 223.

At this time, when the stopper 460 is separated from the insertion hole 223, the seat frame 200 is converted to a state of capable of being folded, and the seat frame 200 is descended. Further, when the latch portion 500 is coupled to the vehicle since the seat back frame 300 and the latch portion 500 are moved to the original positions, the stopper 460 automatically fixes the seat frame 200 by the stopper 460 being inserted into the insertion hole 222.

Therefore, by the latch portion 500, a passenger is capable of folding the seat back frame 300 toward the upper portion of the seat frame 200 by controlling of rotating the seat back frame 300, or the passenger is capable of moving the seat back frame 300 to the original position by separating the seat back frame 300 from the seat frame 200. In these operations, there is an advantage in that the seat frame 200 is capable of being stably fixed so that the seat frame 200 does not move to the upward direction or the downward direction.

In a tip-up operation that is moving the seat frame 200 toward the second direction 2 and the upward direction, the passenger may fold the seat frame 200 to the frontward direction of the seat back frame 300 by folding the seat frame 200 toward the second direction 2 and the upward direction when after the stopper 460 is separated from the insertion hole 222 by moving the center portion of the leg frame 410 toward the first direction 1.

In a state in which the seat frame 200 is folded toward the first direction 1 of the seat back frame 300, when the center portion of the leg frame 410 is moved toward the second direction 2, the leg frame 410 is in close contact with a floor of the seat frame 200, and the stopper 460 fixes the position of the seat frame 200 by being inserted into the insertion hole 223.

In a state in which the seat frame 200 is folded toward the second direction 2 and the upward direction so that the seat frame 200 is fixed toward the first direction 1 of the seat back frame 300, when the leg frame 410 is separated from the floor of the seat frame 200 by moving the center portion of the leg frame 410 toward the first direction 1, the stopper 460 is separated from the insertion hole 223, and the seat frame 200 is converted to a state of movable toward the first direction 1 and the downward direction.

Therefore, in front or in back of the folding seat 100, the folding seat 100 is capable of folding the seat back frame 300 toward the frontward direction and the downward direction or capable of moving the seat back frame 300 to the original position, and the folding seat 100 is capable of folding the seat frame 200 toward the frontward direction of the seat back frame 300 by lifting the seat frame 200, so that there is an advantage in that a loading space is easily secured.

The latch portion 500 includes a fixing bracket 505, a lever 510, a cable 520, a first cover 530, a first connecting bracket 540, a second connecting bracket 550, a claw 560, a guide bracket 570, and a second cover 580.

The latch portion 500 is coupled to the upper portion of the first side portion of the upper frame 320, and is capable of being mounted to or separated from a hook 52 formed at a side surface or in back of the seat back frame 300. Further, a position of the latch portion 500 is adjustable according to a control of the passenger.

The fixing bracket 505 extends toward the upward direction or the downward direction, and has edge portions toward the first direction 1 and the second direction 2 formed in a shape that protrudes toward the first side. Further, the fixing bracket 505 is rotatably coupled to a first end portion of the claw 560 with respect to a shaft that extends toward the first direction 1 or the second direction 2.

The lever 510 is coupled to an upper portion at the first side of the center portion of the upper frame 320 so as to be elastically rotatable with respect to a shaft that extends toward the first side or the second side. Further, the latch portion 500 is separated from or mounted to the hook 52 when the latch portion 500 is operated by controlling the lever 510.

The cable 520 includes a wire 522.

A first end of the cable 520 is connected to the lever 510, and a second end of the cable 520 extends toward the downward direction from the first end of the cable 520 and is positioned at the first side of the upper frame 320. Further, the wire 522 positioned inside the cable 520 protrudes from the second end of the cable 520 and is coupled to both the first cover 530 and the first connecting bracket 540.

The first connecting bracket 540 covered by the first cover 530 has a first end connected to the wire 522, and has a second end that extends toward the first side and the second end of the first connecting bracket 540 is rotatably coupled to the first connecting bracket 540 with respect to a shaft that extends toward the first direction 1 or the second direction 2.

A lower portion of the first connecting bracket 540 is coupled to an upper portion of a first end portion of the claw 560, and when the wire 522 is moved toward the upward direction by controlling the lever 510, the first and the second connecting brackets 540 and 550 and the first end portion of the claw 560 are moved toward the upward direction.

The first end portion of the claw 560 is formed in a horizontal plate shape having wide surfaces arranged toward the upward direction and the downward direction, and is rotatably coupled to the fixing bracket 505. A second end portion of the claw 560 has three edge portions at the first side positioned to be spaced apart toward the frontward direction and the rearward direction of the first end portion of the claw 560 protruding toward the downward direction, so that a fork shape that surrounds two fork grooves is formed.

Therefore, in a state in which the hook 52 is positioned toward the lower portion of the second end portion of the claw 560 that is moved toward the upward direction by the wire 522, when the second end portion of the claw 560 is descended, the hook 52 is inserted into and fixed to any one of the pork grooves.

The second cover 580 is in close contact with the second end portion of the claw 560 and is coupled to the claw 560 and covers the second end portion of the claw 560, and reduces noise that occurs when the claw 560 is fastened to the hook 52.

A center portion of the guide bracket 570 is formed in a vertical plate shape that extends toward the first direction 1 or the second direction 2. Portions of the center portion of the guide bracket 570 at the first direction 1 side and the second direction 2 side are bent and extend toward the second side, and are respectively coupled to a front surface and a rear surface of the fixing bracket 505 that are respectively positioned at the first direction 1 side and the second direction 2 side.

At the first side and the second direction 2 side of the guide bracket 570, a guide groove 572 that is connected to the guide bracket 570 by passing through the first side and the second side is formed at the guide bracket 570, and the hook 52 is inserted into the guide groove 572 and is inserted into the fork groove by being guided by the guide bracket 570.

Referring to FIG. 2, the bracket portion 600 includes first lower brackets 610 and 612, and includes second lower brackets 620 and 622.

Between the extending frame 230 and the leg frame 410, a portion of the bracket portion 600 is coupled to the extending frame 230, and is rotatably coupled to the leg frame 410 with respect to a shaft that extends toward the first side or the second side.

Specifically, a center portion of the first lower bracket 610 is formed in a vertical plate shape that extends toward the first direction 1 and the second direction 2, and edge portions at the first direction 1 side and the second direction 2 side of the center portion of the first lower bracket 610 are bent and extend toward the first side and are coupled to the inside of the first side portion of the extending frame 230.

The portions of the first lower bracket 610 coupled to the extending frame 230 are positioned at the first direction 1 side of the first end of the first frame 210, and are limiting a moving distance that the extending frame 230 in close contact with the first frame 210 is moved when the extending frame 230 is moved toward the second direction 2, so that there is an advantage in that an excessive movement of the extending frame 230 is prevented.

At an upper portion of the second side of the center portion of the first lower bracket 610, a center portion of the second lower bracket 620 is formed in a horizontal plate shape having wide surfaces arranged toward the upward direction and the downward direction. Portions at the first side and the second side of the center portion of the second lower bracket 620 are bent and extend toward the downward direction, and are rotatably coupled to an end portion of the first side portion of the leg frame 410.

A second side surface of the first side of the second lower bracket 620 is surface-coupled to a first side surface of the center portion of the first lower bracket 610. Between the center portion of the first lower bracket 610 and the second side of the second lower bracket 622, the end portion of the first side portion of the leg frame 410 is rotatably coupled to both the first and the second lower brackets 610 and 620.

Therefore, an outer side surface and an inner side surface of the first side portion of the leg frame 410 at the first direction 1 side are stably coupled to the extending frame 230 by the center portion of the first lower bracket 610 and the second side portion of the second lower bracket 622.

In addition, the end of first side portion of the leg frame 410 is rotatably coupled to the coupling member 422 with respect to a shaft that extends toward the first side or the second side. Further, according to the rotation of the leg frame 410, the coupling member 422 is pulled toward the second direction 2 and the upward direction or is moved toward the first direction 1 and the downward direction.

Each of the first and the second lower brackets 612 and 622 and each of the first and the second lower brackets 610 and 620 are formed in the same structure symmetrical to each other with the leg frame 410 disposed therebetween, and are rotatably coupled to the end of the second side portion of the leg frame 410 in the same coupling manner.

Therefore, there is an advantage in that a functionality of the folding seat 100 is capable of being improved by performing a process in which the leg frame 410, the cable 420, the first bracket 430, the second bracket 440, the spring 450, the stopper 460, and the fixing member 470 that configure the locking portion 400 are mounted to an existing seat by using the bracket portion 600, and by performing the process of forming the insertion holes 222 and 223 at the seat frame 200.

In addition, in the folding seat 100, the seat frame 200 is capable of being positioned at a position adjacent to the seat back frame 300 by folding the seat frame 200 toward the second direction 2 and the upward direction, so that there is an advantage in that utilizing a lower space at a rear seat where the seat frame 200 is positioned is capable.

In addition, there is an advantage in that the folding seat 100 without a separate switch is capable of controlling a folding operation of the seat frame 200 by utilizing the leg frame 410 that supports the lower portion of the seat frame 200.

Although preferred embodiments of the present disclosure have been described with reference to the accompanying drawings, the embodiments described in the specification and the configurations illustrated in the drawings are merely examples and do not exhaustively present the technical spirit of the present disclosure. Accordingly, it should be appreciated that there may be various equivalents and modifications that can replace the embodiments and the configurations at the time at which the present application is filed. Therefore, preferred embodiments of the present disclosure have been described for illustrative purposes, and should not be construed as being restrictive. The scope of the present disclosure is defined by the accompanying claims rather than the description which is presented above. Moreover, the present disclosure is intended to cover not only the exemplary embodiments, but also various alternatives, modifications, equivalents and other embodiments that may be included within the spirit and scope of the present disclosure as defined by the appended claims.

What is claimed is:

1. A folding seat, comprising:
    a seat frame;
    a seat back frame cross-arranged in back of the seat frame, the seat back frame having a first side rotatably coupled to the seat frame; and
    a locking portion coupled at a first side thereof to the seat back frame and rotatably coupled at a second side thereof to the seat frame at a position between the seat frame and the seat back frame,
    wherein the locking portion comprises:
        a first bracket coupled to a side surface of the seat back frame;
        a stopper slidably coupled to the first bracket so that the stopper is inserted into or separated from an insertion hole of the seat frame, the insertion hole corresponding to both folding operation and tip-up operation of the folding seat; and
        a leg frame rotatably coupled to the lower portion of the seat frame and connected to the stopper by a cable in such way that the stopper inserted into the insertion hole is separated from the insertion hole when the leg frame is unfolded so as to be positioned distant to the lower portion of the seat frame, and the stopper is inserted into the insertion hole when the leg frame is folded so as to be positioned adjacent to the lower portion of the seat frame.

2. The folding seat of claim 1, wherein the leg frame is bent and extends from a lower portion of the seat frame toward the seat frame at a first side and a second side thereof and is rotatably coupled to the seat frame, and an end surface of the first side or the second side of the leg frame is connected to the cable.

3. The folding seat of claim 2, wherein a wire inside the cable that is coupled to the leg frame is fixed to the seat frame at a position below the leg frame when the leg frame is in a state in which the leg frame is folded so as to be positioned adjacent to the lower portion of the seat frame.

4. The folding seat of claim 1, further comprising a latch portion, the latch portion being coupled to the seat back frame and being configured to adjust a folding angle of the seat back frame by an operation of a lever.

\* \* \* \* \*